No. 834,700. PATENTED OCT. 30, 1906.
S. ABBOTT.
PULLEY.
APPLICATION FILED MAY 14, 1906.
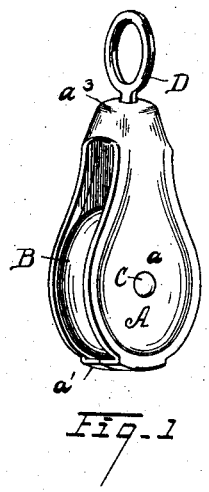
Fig. 1
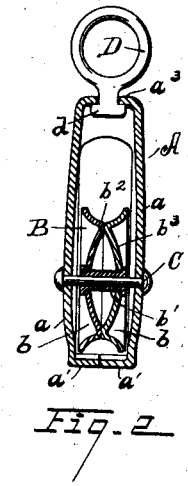
Fig. 2
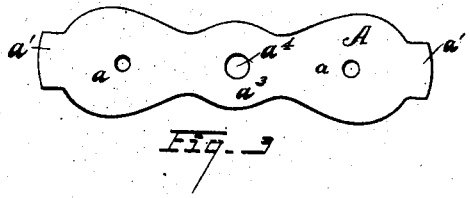
Fig. 3
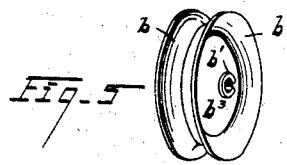
Fig. 5
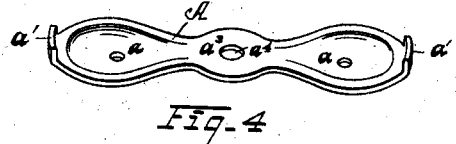
Fig. 4
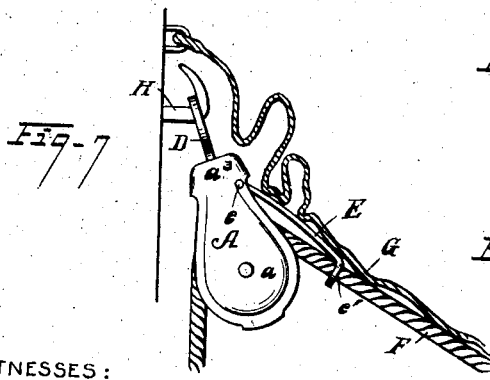
Fig. 7
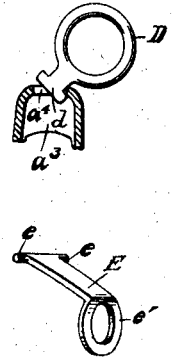
Fig. 6
Fig. 8
WITNESSES:
Brennan B. West
W. R. McGarrell
INVENTOR,
Samuel Abbott,
BY Bates, Fouts & Hull,
ATTYS.

UNITED STATES PATENT OFFICE.

SAMUEL ABBOTT, OF CLEVELAND, OHIO.

PULLEY.

No. 834,700. Specification of Letters Patent. Patented Oct. 30, 1906.

Application filed May 14, 1906. Serial No. 316,600.

*To all whom it may concern:*

Be it known that I, SAMUEL ABBOTT, a citizen of the United States, residing at Cleveland, in the county of Cuyahoga and State of Ohio, have invented a certain new and useful Improvement in Pulleys, of which the following is a full, clear, and exact description, reference being had to the accompanying drawings.

The object of this invention is to provide a very simple and efficient pulley adapted for embodiment in a comparatively small structure, such as is used for awnings, yachts, &c.

My pulley is designed to be made very cheaply out of stampings, while possessing ample strength for the purposes for which it is intended.

The particular characteristics of the invention are hereinafter more fully described, and definitely summarized in the claims.

The drawings clearly show my invention.

Figure 1 is a perspective view of the pulley complete. Fig. 2 is a vertical cross-section thereof. Fig. 3 is a view of the blank from which the pulley-body is made. Fig. 4 is a view of such blank after it has been pressed and the ends turned over. Fig. 5 is a perspective view of the wheel of the pulley. Fig. 6 is a view illustrating the way in which the eye is inserted. Fig. 7 is a side elevation of my pulley having a guard to prevent the wheel becoming jammed by an awning-cloth or sail, for example. Fig. 8 is a perspective view of the guard.

Referring to the parts by letters, A represents the pulley-body, which is a sheet-metal plate bent into the approximate U shape shown. The blank for this body is shown in Fig. 3. After the blank is formed the body is embossed and the ends $a'$ are turned at right angles, as shown at Fig. 4. Then the side portions $a$ of the body are bent over parallel with each other, causing the end portions $a'$ to abut, the intermediate portion $a^3$ being at the same time formed into a bell shape, as shown. The wheel B stands between the side plates $a$ and is journaled on the rivet C, which holds the side plates together.

A hole $a^4$ is made through the intermediate portion $a^3$ of the pulley-body, and the eye D has a T-head $d$ passed through the opening $a^4$ after the manner shown in Fig. 6. After the eye is in place the portion $a^3$ of the pulley around the shank of the eye is forced inward to close the hole $a^4$ sufficiently to securely hold the eye, while leaving it free to turn, as shown in Fig. 2. This is a very cheap method of swiveling the eye and has been found to be efficient in service. The bell-head of the pulley-body extends upwardly slightly, as shown in Fig. 6, before the eye is inserted, and after the eye is inserted a simple flattening of this head reduces the opening $a^4$ sufficiently to securely hold the eye.

The wheel B is made of two dish-shaped members $b$, as shown in Fig. 2, secured together by a tubular rivet $b'$, which extends through the members and is upset on the outer sides thereof. This tube $b'$ forms at once the means for securing the two halves of the wheel together and the journal-bearing for the wheel. To cause the two portions of the wheel to snugly abut at the base of the groove $b^2$, the side portions are bowled outwardly, as shown at $b^3$, so that the two halves may be put under some constraint by the upsetting of the rivet.

When a pulley is used with awnings, for example, it frequently happens when the cord is wet that the cloth sticks to it and is drawn into the pulley-body, jamming therein. To prevent this, I may provide a guard, (indicated by E in Figs. 7 and 8,) which is a sheet-metal member having ears $e$ occupying openings in the side plates $a$ and having at the other end an inwardly-extending eye $e'$, through which the rope may pass. Fig. 7 shows the rope designated F, the awning-canvas G, and the hook H supporting the pulley.

My pulley is extremely cheap to construct, is light, is neat in appearance, and is durable and efficient in service.

Having thus described my invention, I claim—

1. A pulley comprising a sheet-metal body portion having parallel sides and a connecting portion, a wheel between the sides, and a permanently-closed eye having an integral shank with an enlarged integral head, the shank passing through an opening in the intermediate portion of the body, and the head on the shank being beneath such intermediate portion.

2. A pulley comprising a metal body portion having parallel sides and a bell-shaped upper end connecting the sides, a rivet connecting the sides, a wheel journaled on said rivet between the sides, and an eye having a shank with an enlarged head, the shank passing through an opening in the intermediate portion of the body, and the head on the shank being beneath such intermediate portion.

3. In a pulley, the combination with a wheel of a sheet-metal body, and an eye made of a single flat piece of sheet metal and comprising a permanently-closed ring, an integral neck, and an integral head, the neck passing through an opening in the body and said head being below the opening, said eye being swiveled to the body by reason of said opening being contracted about said neck.

4. In a pulley, the combination of a body portion made of a single piece of sheet metal bent to present parallel sides, and ears below the sides projecting toward each other, a wheel journaled between the sides, and an eye swiveled to the body portion above the wheel.

5. In a pulley, the combination of a sheet-metal body comprising a pair of parallel sides, and an intermediate integral portion connecting the sides, abutting extensions formed on the two sides, respectively, a rivet holding the body with said extensions abutting, and a wheel journaled on said rivet.

6. In a pulley, the combination of a sheet-metal body stamped from a single piece of metal and comprising a pair of parallel sides, and an intermediate head portion connecting the sides and inwardly-projecting abutting ears at the lower ends of said sides, a wheel between the sides, and a rivet passing through the wheel and sides and upset on the outer faces of the sides, said rivet holding the sides in place with the ears abutting and forming a bearing for the wheel.

7. In a pulley, the combination with the sides, of a rivet connecting them, a wheel between the sides composed of a pair of flanged members, and an upset tube securing them together, said tube being journaled on said rivet.

8. A pulley-wheel, consisting of a pair of dish-shaped members secured together by an axially-placed tubular rivet.

In testimony whereof I hereunto affix my signature in the presence of two witnesses.

SAMUEL ABBOTT.

Witnesses:
ALBERT H. BATES,
W. L. McGARRELL.